United States Patent [19]

Mamery

[11] Patent Number: 5,184,701
[45] Date of Patent: Feb. 9, 1993

[54] DEVICE FOR COMPENSATING THE CONTROLLED CLEARANCE ON BRAKE DRUMS OF LORRIES AND SEMI-TRAILERS

[76] Inventor: Gaby Mamery, F-51300 Blacy, France

[21] Appl. No.: 598,664
[22] PCT Filed: Feb. 26, 1990
[86] PCT No.: PCT/FR90/00133
  § 371 Date: Oct. 22, 1990
  § 102(e) Date: Oct. 22, 1990
[87] PCT Pub. No.: WO90/10163
  PCT Pub. Date: Sep. 7, 1990

[30] Foreign Application Priority Data

Feb. 27, 1989 [FR] France ............... 89 02636

[51] Int. Cl.⁵ ................................ F16D 65/60
[52] U.S. Cl. .................... 188/79.55; 188/196 BA; 192/111 A
[58] Field of Search ......... 188/196 B, 196 BA, 79.55, 188/79.62, 79.51, 79.57, 79.58; 192/111 A, 114 T, 46

[56] References Cited

U.S. PATENT DOCUMENTS

| | | | |
|---|---|---|---|
| 1,992,117 | 2/1935 | Bourdon | 188/79.55 |
| 2,094,563 | 9/1937 | Myers | 188/79.63 |
| 2,194,584 | 3/1940 | Boldt | 188/196 BA |
| 2,633,949 | 4/1953 | Lavash | 192/46 X |
| 2,664,975 | 1/1954 | Darr | 188/196 A |
| 3,013,638 | 12/1961 | Satrum | 188/79.55 |
| 3,348,639 | 10/1967 | Ames et al. | 188/196 BA |
| 3,926,284 | 12/1975 | Iturriaga Notario | 188/196 BA |
| 3,943,894 | 3/1976 | Sumpter | 192/46 X |
| 4,116,314 | 9/1978 | Ackerman | 192/46 |
| 4,150,735 | 4/1979 | Acre et al. | 188/196 BA |
| 4,161,240 | 7/1979 | Pringle | 188/196 BA |
| 4,518,063 | 5/1985 | Camph | 192/111 A X |
| 4,836,348 | 6/1989 | Knödel et al. | 192/114 T X |

FOREIGN PATENT DOCUMENTS

| | | |
|---|---|---|
| 2238090 | 2/1075 | France . |
| 1604913 | 6/1972 | France . |
| 2224676 | 10/1974 | France . |
| 2277274 | 1/1976 | France . |
| 2389042 | 11/1978 | France . |
| 0775469 | 10/1980 | U.S.S.R. ............ 188/196 BA |

Primary Examiner—Robert J. Oberleitner
Assistant Examiner—Jose A. Ballato
Attorney, Agent, or Firm—Pearne, Gordon, McCoy & Granger

[57] ABSTRACT

Device for compensating the clearance between brake linings and drums accomplished by means of ratchets (21) engaged during displacement of the operating system of the camshaft (10) with the peripheral teeth (14) of an intermediate ring (11) fixed to the camshaft (10). The ratchets are retained in receptacles having a width greater than the ratchets. The ratchets and the teeth have mating undercuts. The greater width provides the desired brake clearance after adjustment and the undercuts provide both a full release of the ratchet and a slight relaxation of the adjustment.

7 Claims, 5 Drawing Sheets

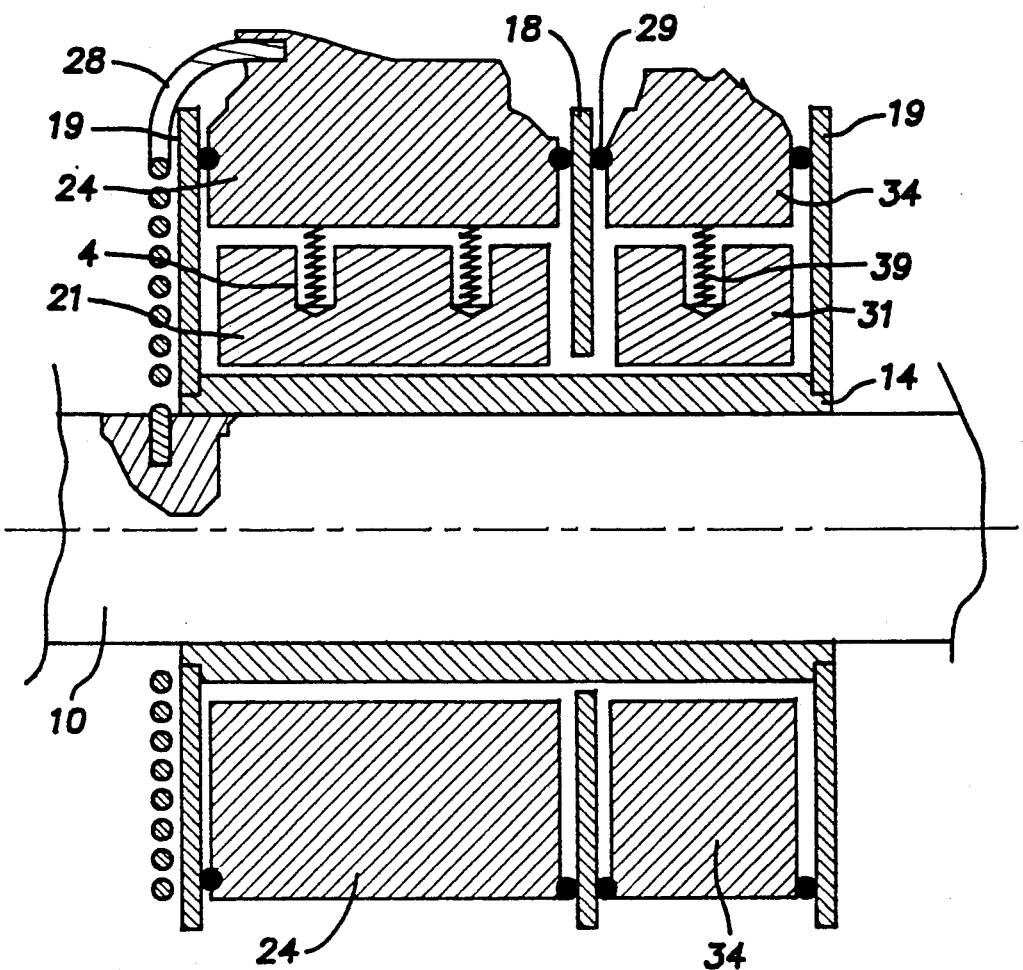
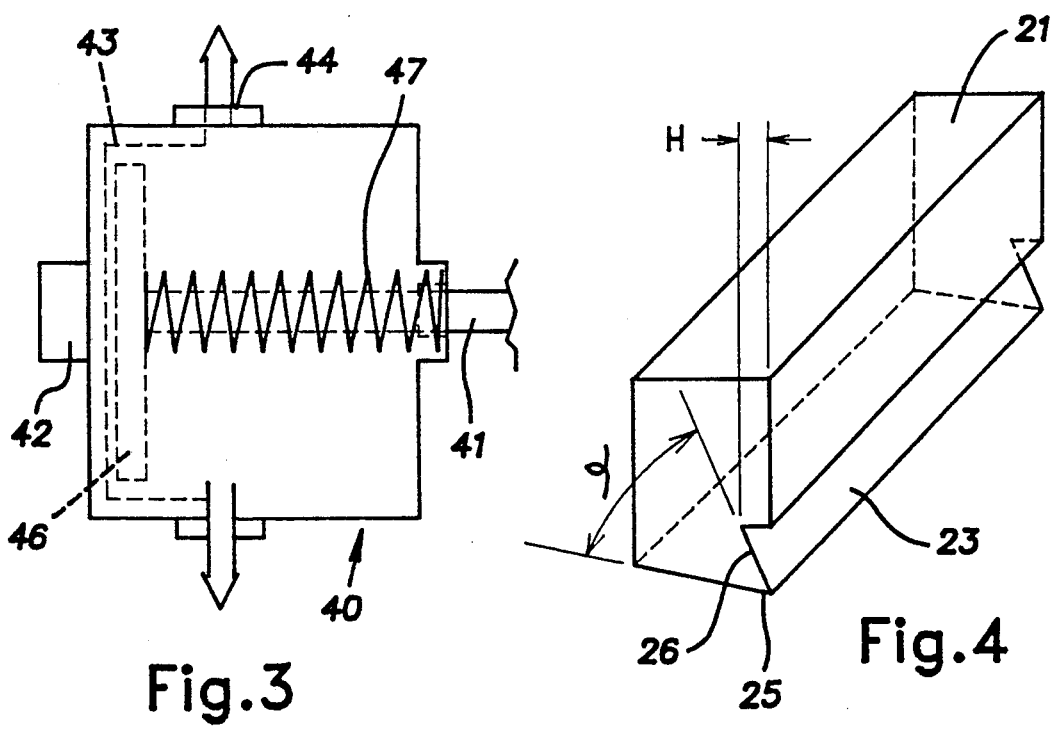
Fig.2
Fig.3
Fig.4

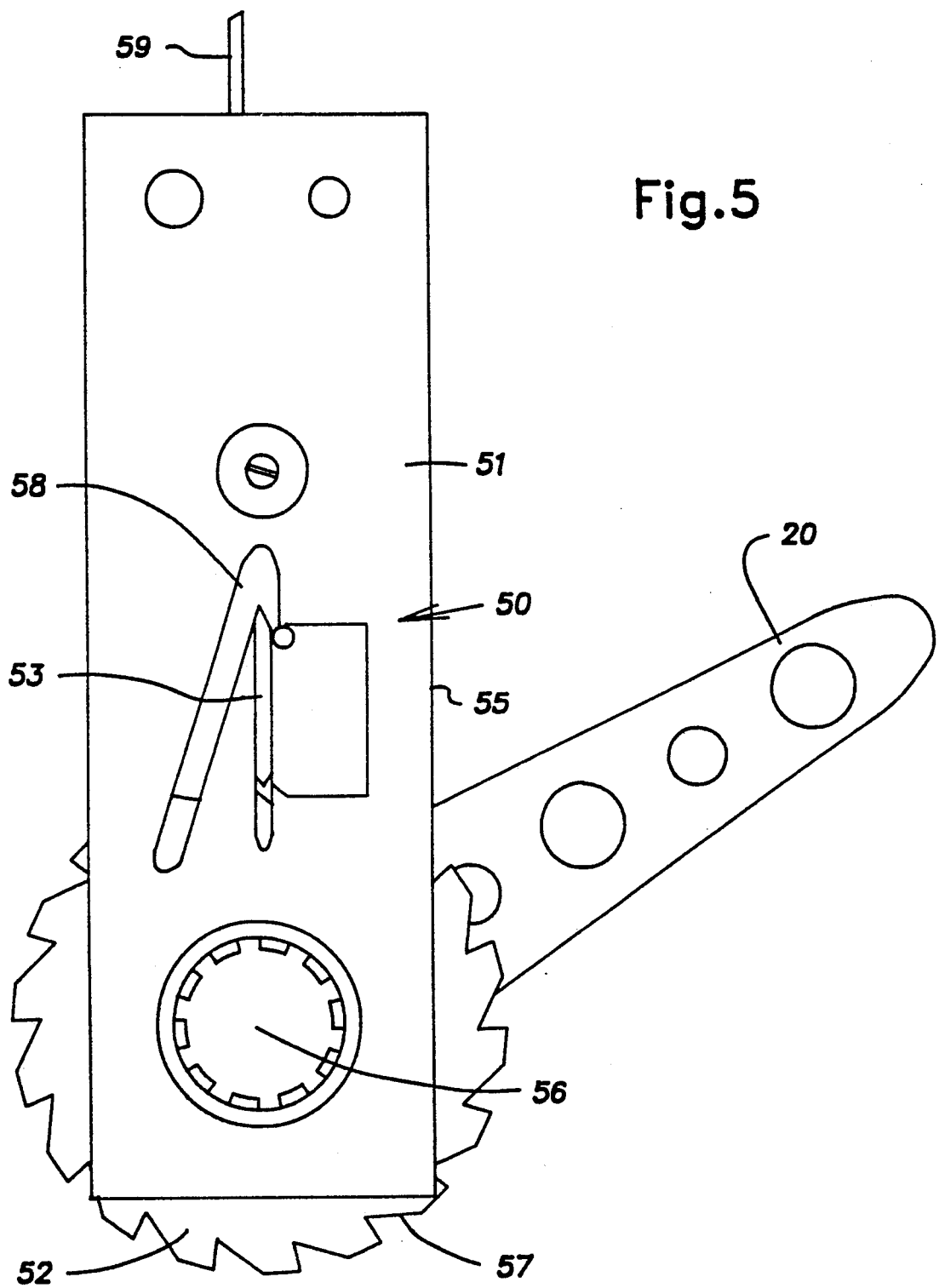

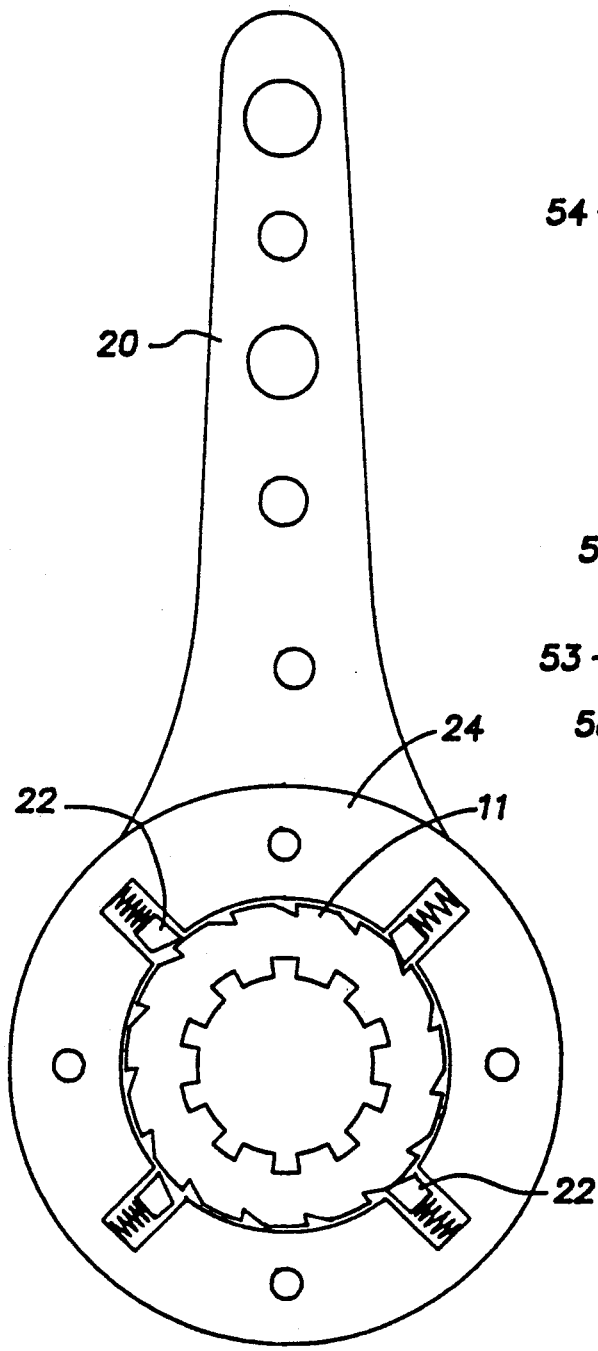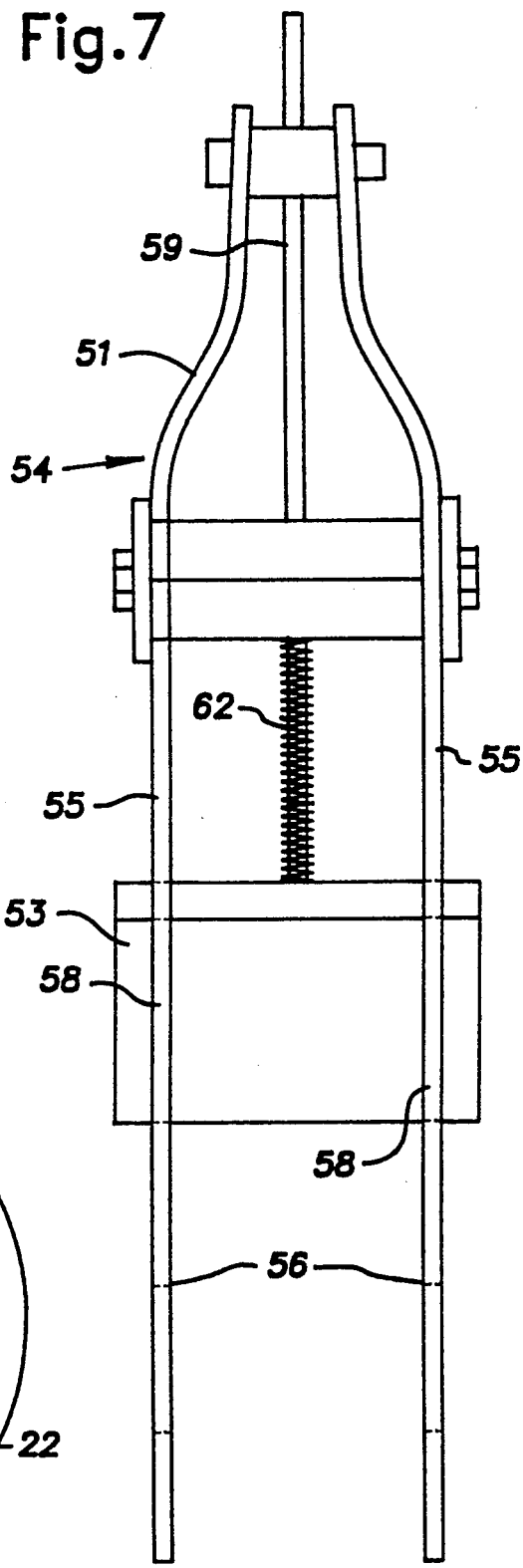

DEVICE FOR COMPENSATING THE CONTROLLED CLEARANCE ON BRAKE DRUMS OF LORRIES AND SEMI-TRAILERS

BACKGROUND OF THE INVENTION

This invention relates to devices for the operation of drum brakes used for trucks or trailers and in particular with devices for the adjustment of the clearance between the brake lining and the drums.

In the adjustment device described in French Patent 2,277,274, a cam for adjusting the clearance of the brake shoes is driven by means of a shaft, lever and gear. The adjustment is effected by a helical gears driving the gear on the camshaft.

Devices for automatic clearance adjustment which attempt to progressively ratchet the cam at each operation of the brake are described in French Patent Nos. 2,389,042 and 2,224,676. In these devices, the brake shoes are kept against the drums for a certain length of time. This causes wear of the brake lining and an overheating of the drums, which can over a long period cause a blow-out of the tires.

French Patent Nos. 1,604,913 and 2,238,090 show ratcheting systems which insure, at each braking, a cancellation of the clearance, which may exist at rest between the brake lining and the drums, without thereby introducing a residual braking. However, this reduction of clearance does not permit the retrieving of the clearance, which is recommended in order to account especially for the successive expansions due to prolonged brakings. Also, these devices may produce certain wheel lock-ups, which are a detriment to the stability of the vehicle and to the life of the tires.

SUMMARY OF THE INVENTION

The present invention intends to remedy the disadvantages of the above-mentioned devices and provides a clearance adjustment device which permits a considerable reduction in the wear of brake linings and brakes and yet to keeps an optimum permanency of clearance between the linings and the drums.

A brake clearance adjuster includes a brake actuating camshaft; an intermediary ring in splined engagement with the camshaft, the ring having a plurality of teeth on its periphery, each tooth having an undercut wall; a hub having a brake operating lever attached thereto and a circular bore concentrically disposed about the camshaft, the bore having at least one radially extending rectangular receptacle around its circumference, each receptacle having a width in the circumferential direction of the bore; and a plurality of generally rectangular ratchets, each located in one of the receptacles and having a tapered tooth having an undercut wall adapted to mate with one of the undercut walls in the intermediary ring and having a width in the circumferential direction of the bore less than the width of the receptacles by an amount in proportion to a desired brake clearance, the hub being freely rotatable in one direction about the camshaft but engaging the camshaft to turn with the hub in the opposite direction when one of the ratchet teeth mates with one of the intermediary ring teeth.

The brake clearance adjuster may also include another hub having an adjusting lever attached thereto and a circular bore concentrically disposed about the camshaft adjacent to the first hub, the bore having a plurality of radially extending rectangular receptacles along its circumference; a plurality of generally rectangular ratchets, each located in the receptacles of said other hub and adapted to engage with one of the intermediate ring teeth; and an actuator connected between the operating lever and the adjusting lever, the actuator being adapted to alternately rotate the levers apart and together, thereby alternately ratcheting the hubs around the camshaft until a desired brake clearance is achieved.

Another embodiment of the invention also includes a pair of ratchet wheels attached coaxially with the bore to opposite sides of the hub; a manual adjustment lever having two parallel arms pivoted about the camshaft, each arm having a radial slot therein, the arms being joined at a point removed from the ratchet wheels; and a ratchet retained in the adjustment lever slots, manual movement of the manual adjustment lever ratcheting the hub around the camshaft.

Another additional embodiment of the invention also includes an actuator attached to the hub and having an extendable flexible tip that is adapted to tangentially engage one of the intermediate ring teeth and rotate the ring with respect to the hub when extended, whereby a new ratchet and intermediate ring tooth can be engaged.

The brake clearance adjuster may also include a spiral spring having a first and second end, the spring being coiled around the camshaft, the first end attached to the operating lever and the second end attached to the camshaft, the spring tightening as the hub ratchets on the intermediate ring.

The non-manually operated brake clearance adjusters may also be operated in parallel with a braking actuator, whereby brake clearance is adjusted each brake actuation.

The advantages brought by the invention lie mainly in the fact that the clearance adjustment is done from a distance, it is fully automatic, in its pneumatic version and that in all cases the clearance adjustment is effected without any cancellation of it. This eliminates any risk of abnormal wear of the linings and the overheating of the brake drum, thereby locking the wheels.

The other characteristics and advantages appear in the following description of the preferred embodiments explained by non-limiting examples, in connection with the attached drawings.

BRIEF DESCRIPTION OF THE DRAWINGS

FIG. 2 is a sectional view along the line B—B with portions cut away of the embodiment of FIG. 1.

FIG. 3 is a schematic diagram of a pneumatic actuator used in the device in the embodiment of FIG. 1.

FIG. 4 is a perspective view of a ratchet according to the invention.

FIG. 5 is a front elevation view of an additional embodiment of the invention.

FIG. 6 is a front elevation view of the brake operating lever and hub assembly used in the embodiment of FIG. 5.

FIG. 7 is a side elevation view of the adjusting lever and ratchet assembly used in the embodiment of FIG. 5.

DETAILED DESCRIPTION OF THE PREFERRED EMBODIMENTS

Figure 1:
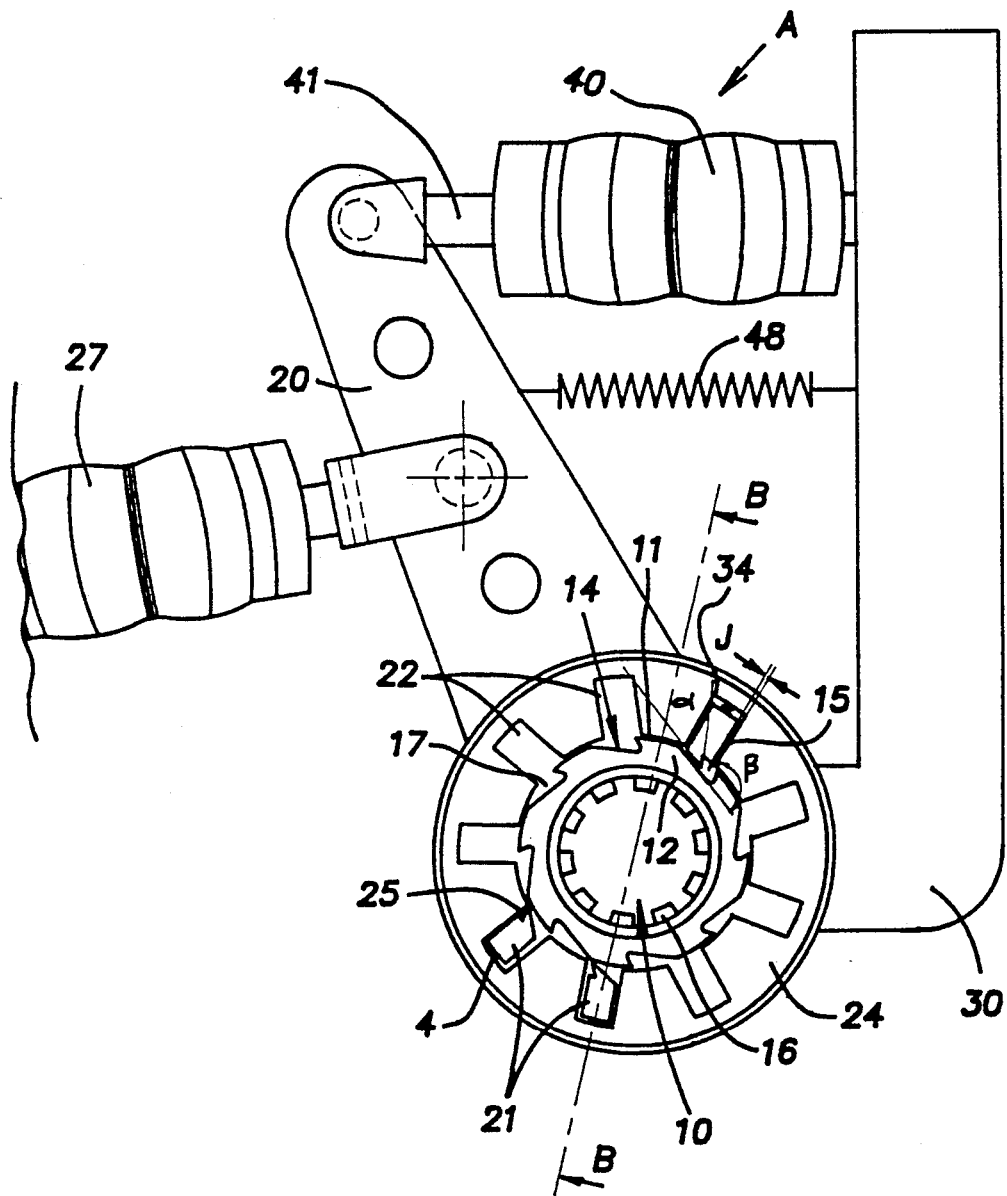
FIG. 1 is a front elevation view of a brake clearance adjuster according to the invention.

In examining FIGS. 1 and 2 it can be observed, that the device A for adjusting the clearance between the brake lining and the drum, consists of two portions. The first portion includes a hub 24 on which is located a brake operating lever 20 for operating the camshaft 10. The periphery of the bore of the hub 24 is provided with receptacles 22 for ratchets 21. The camshaft 10 contains splines at its end opposite the cam. The intermediary ring 11 contains splines 16 that engage those of the camshaft 10. The outer periphery of the ring 11 contains teeth 14. The number of receptacles 22 and of the teeth 14 are not limiting and are a function of the precision, which will be given to the clearance adjustment so that it always has a "tooth space" 17 consistent with a receptacle 22 whatever the position of the camshaft 10 may be. It is necessary that the total number of receptacles 22 be greater than the number of teeth 14. In this example, the number of receptacles 22 is nine, while the number of teeth 14 is eight. The cooperation between the receptacles 22 and the teeth 14 is accomplished by the ratchets 21 and by return springs 4. These ratchets 21 are approximately of parallelepiped form and are designed to slide freely in the receptacles 22. Their length is fixed in order to achieve a complete release of the teeth 14 and their width is somewhat less than the circumferential width of the receptacles 22 in order to provide a lateral clearance J as a function of the desired clearance between the lining of the brake shoes and the drums after elimination of any excess clearance. The tapered tooth 25 of the ratchets 21 has an angle alpha complementary to angle beta, formed by the front 15 of the teeth 14. The tapered teeth 25 of the ratchets 21 is urged against the intermediary ring 11 by means of springs 4 placed between the top part of ratchets 21 and the bottom of the receptacles 22.

The device pursuant to the first embodiment includes as a second portion a second hub 34 having an adjusting lever 30. The hub 34 has half the thickness of the hub 24. The ratchets 31, which are provided, are likewise of lesser thickness and their top part consists only of a hole 39 in order to place one spring 4 instead of two as in the above-described hub 24.

In position for use, the hubs 24, 34 are fixed on the same intermediary ring 11. A bracing washer 18 is inserted between the two hubs 24, 34 in order to avoid interference between the ratchets 21 and the ratchets 31 and disturbing the functioning of the device by interposing, for example, in the receptacle of the neighboring hub. In this position, a ratchet 21 of the first hub 24 and a ratchet 31 of the second hub 34 are each in a "tooth space" 17 of the intermediary ring 11. In order to permit the movement in relation to the two hubs 24, 34 by the intermediary of the operating lever 20 or the adjusting lever 30, respectively, the operating lever 20, adjusting lever 30 and a double-acting pneumatic actuator 40, are used. The actuator 40 will be described further below. The cylinder of the actuator 40 is mounted on adjusting lever 30 and the rod 41 of the actuator 40 is fixed on the operating lever 20.

When the brake is actuated, the air is sent toward the inlet of the actuator 40. This moves the rod 41 of the actuator 40, thereby separating the lever 20 from the lever 30. The hub 24 is then actuated in rotation around the intermediary ring 11 at a desired angle and stabilized in this position by gearing of a ratchet 21 against a tooth 14. The camshaft 10 remains stationary in rotation. When the angular shifting corresponding to the course of the actuator 40 has been obtained, the entry of air in the actuator 40 is suppressed and the latter is drawn back carrying along with it the adjusting lever 30, in rotation to the original position. Air entering a brake actuator 27, at the same time causes the rotation of the camshaft 10, due to the fact, that the ratchet 21 is at that moment engaged against the tooth 14. This rotation of the camshaft 10 causes at the same time the locking of another ratchet 31 of the hub 34 against a tooth. In this manner, whatever the width of the angular shifting of the operating lever 20 and of the camshaft 10 may be, a ratchet 31 of the hub 34 will lock against a tooth 14 of the intermediary ring 11 in order to insure the support for a subsequent utilization. A spring 48 can be connected with the device in order to facilitate the return of the adjusting lever 30.

It is to be noted, that in the shown example, in which the hub 24 contains nine receptacles 22 and the intermediary ring 11 has eight teeth 14, the angular displacement of 5° of lever 20 corresponds to locking with a new tooth 14, which, in turn, causes a 5° rotation of the camshaft 10.

For a better understanding, FIG. 2 shows an advantageous arrangement of the device, in which two ratchets 21, 31 of the two hubs 24, 34 in relation to the washer 18 are found against the same tooth 14 of the intermediary ring 11, at the same moment.

Further, a spiral spring 28 is coiled around the camshaft 10, with one end affixed to said camshaft 10 and the other end to the hub 24. The spring 28 tightens depending on the adjustment effected such that it favors the shifting of the ratchets.

It can be seen in FIG. 2, that there are three washers in existence. The function of the first washer 18 has already been described. The two other washers 19 can be welded on the camshaft 10 or linked together by other means in a longitudinal direction. The O-rings 29 provided to insure tightness, have been placed between the washers 18, 19 and the hubs 24, 34. It can also be noted, that as a durable brake lining wear indicator the end of the camshaft 10 can be linked to the device.

FIG. 3 shows an actuator 40 of a known type. It is of approximately parallelepiped form. It shows an air inlet 42 and its internal part consists of a plastic flexible membrane 43, placed parallel to the interior wall of the actuator 40 and fastened to it by rings 44. When the air is dispatched into the actuator 40, the membrane 43 exerts a pressure on the (plastic or iron) member 46, which, in turn, causes the displacement of the rod 41. When the air access is cut, the member 46 returns by itself, at the same time bringing back the rod 41 and what is connected with it, to its initial position. A spring 47 can be incorporated into the actuator 40 to assist in the return of the rod 41. This spring 47 can be integrated into the actuator 40 or be arranged on the outside. In the invention, it can be arranged between the levers 20, 30 (48 in FIG. 1).

In FIG. 4 it can be observed, that the ratchets 21 of the first hub 24 show on the carrying face 23 of their tooth 25 a slight clearance 26 of angle alpha in relation to the end of the ratchet 21 and complementary to the angle formed by the teeth 14 of the intermediary ring 11. Because of this, a partial release of the ratchet 21 is avoided when it drops down to engage a new tooth 14.

Moreover, a clearance H has been provided, which permits the return of the ratchet 21 after each working in order to release the brake lining and thereby minimize the wear of the brakes.

In FIG. 5, 6 and 7 a second form of realization pursuant to the invention is shown. Similar to the first embodiment, it has a has a hub 24 equipped with a brake operating lever 20 and receptacles 22. Here, the number of receptacles 22 is reduced to four. In this embodiment, the second portion includes a manual adjustment mechanism 50. The adjustment lever 51 includes two rectangular arms 55 joined at a top portion 54. These arms 55 have openings 56, designed for the passage of the intermediary ring 11. Likewise, the hub 24 is arranged between the two arms 55 around the intermediary ring 11 and between two ratchet wheels 52 with teeth 57 welded on the intermediary ring 11 on both sides of the hub 24. The teeth 57 of the wheels 52 are destined to cooperate with a ratchet 53, placed in a slot 58 in each of the arms 55. The ratchet 53 is continuously returned towards the ratchet wheels 52 by a rod 59 guiding a spring 62.

In this embodiment, the lever 20 is held stationary. Then the ratchet 53, placed between two teeth 57 of the ratchet wheels 52, drives the rotation of the intermediary ring 11, as the result of the manual movement of the adjusting lever 51. The rotation of the intermediate ring 11 adjusts the brake clearance. The lever 51 can also be manually moved counter-clockwise, without, in this case, moving the intermediary ring 11 in order to arrange thereby for a clearance adjustment. It has to be stressed that an important clearance can also be gradually cancelled by imparting alternative rotating movements to the lever 51.

Figure 8:
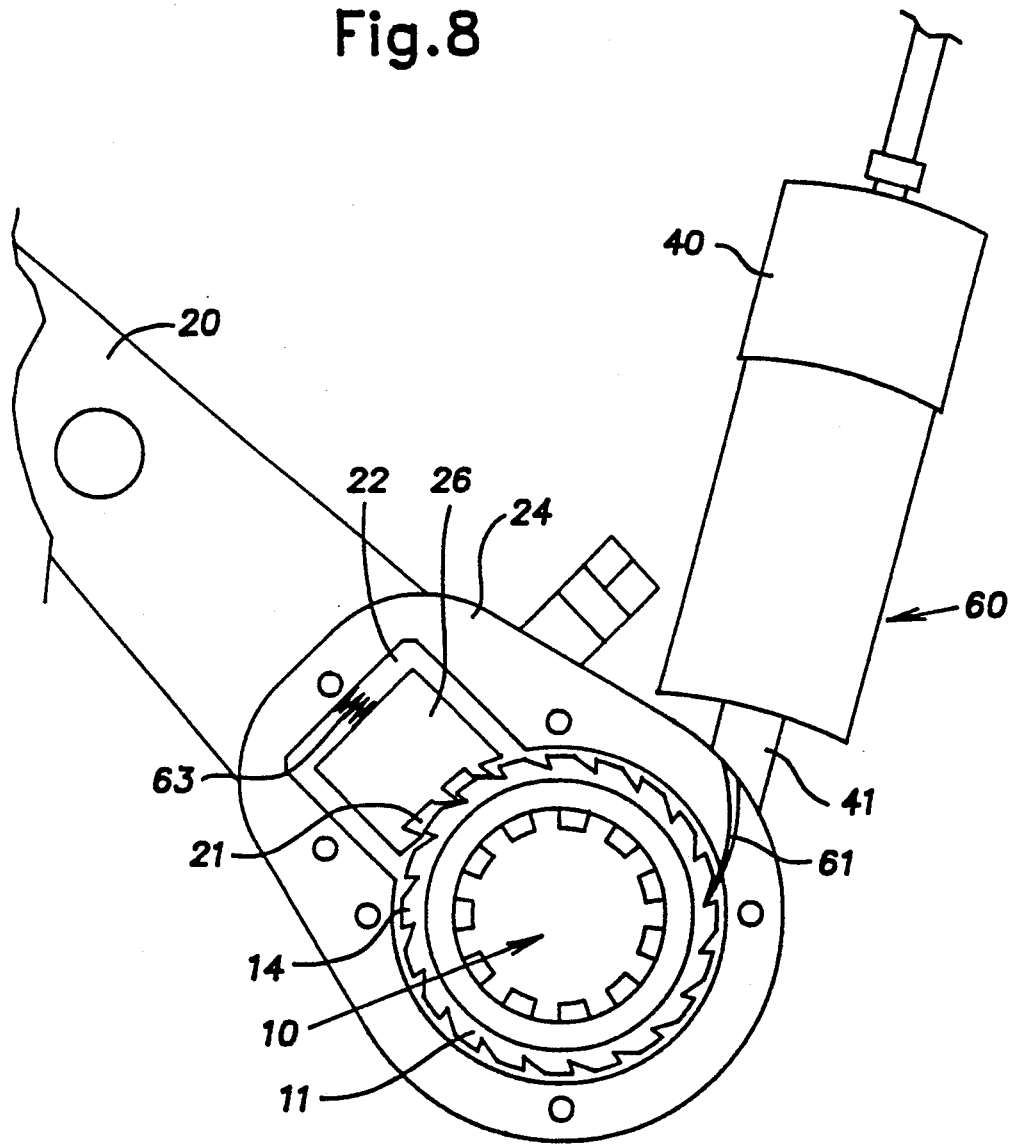
FIG. 8 is a front elevation view of another additional embodiment of the invention.

In FIG. 8, a third embodiment is shown, in which an automatic clearance adjustment device 60 integral to hub 24 permits a direct adjustment of the position of the camshaft 10. An actuator 40 acts directly by means of a flexible tip 61 situated on the extension of its rod 41 on the teeth 14 of the intermediary ring 11 in order to drive it in rotation up to the cancellation of the clearance. The hub 24 includes a single receptacle 22, which permits the erection and movement of a parallelepipedic piece 26, of which the internal part forms three ratchets 21. A spring 63 permits the movement of the ratchets 21 in the receptacle 22 and the return movement towards the toothed part of the intermediary ring 11.

The device, which is the subject of the invention, can be advantageously be used for most vehicles equipped with drum brakes, where the control cam of the brake shoes is operated by means of a lever and especially on trucks, trailers and semi-trailers.

Although several detailed embodiments of the invention have been described and shown, it is obvious that the invention is not limited to these forms and means, but that it extends to all devices for the adjustment of clearances, which have the general characteristics described above.

What is claimed:

1. A brake clearance adjuster, comprising:
   a brake actuating camshaft;
   an intermediary ring in splined engagement with said camshaft, said ring having a periphery and a plurality of teeth on said periphery, each tooth having an undercut wall;
   a first hub having a brake operating lever attached thereto and a circular bore concentrically disposed about said camshaft, said bore having a plurality of radially extending rectangular receptacles around its circumference, each receptacle having a width in the circumferential direction of said bore; and
   a plurality of generally rectangular ratchets, each located in one of said receptacles and having a tapered tooth having an undercut wall adapted to mate with one of the undercut walls in said intermediary ring and having a width in the circumferential direction of said bore less than said width of the receptacles by an amount in proportion to a desired brake clearance, said undercut walls permitting said ratchet to fully release into engagement with said intermediary ring and providing a clearance for partial rotation of said first hub, said first hub being freely rotatable in one direction about said camshaft but engaging said camshaft to turn with said first hub in the opposite direction when one of said ratchet teeth mates with one of said intermediary ring teeth.

2. A brake clearance adjuster according to claim 1, further comprising:
   another hub having an adjusting lever attached thereto and a circular bore concentrically disposed about said camshaft adjacent to said first hub, said another hub bore having a plurality of radially extending rectangular receptacles along its circumference;
   a plurality of generally rectangular ratchets, each located in the receptacles of said another hub and adapted to engage with one of said intermediate ring teeth; and
   an actuator connected between said operating lever and said adjusting lever, said actuator being adapted to alternately rotate said levers apart and together, thereby alternately ratcheting said hubs around said camshaft until a desired brake clearance is achieved.

3. A brake clearance adjuster according to claim 2, wherein the actuator is operated in parallel with a braking actuator, whereby brake clearance is adjusted each brake actuation.

4. A brake clearance adjuster according to claim 1, further comprising:
   at least one ratchet wheel attached coaxially with said bore to a side of said first hub;
   a manual adjustment lever having two parallel arms pivoted about said camshaft, each arm having a radial slot therein, said arms being joined at a point removed from said at least one ratchet wheel; and
   a ratchet retained in said adjustment lever slots, manual movement of said manual adjustment lever ratcheting said first hub around said camshaft.

5. A brake clearance adjuster according to claim 1, further comprising an actuator attached to said first hub and having an extendable flexible tip that is adapted to tangentially engage one of said intermediate ring teeth and rotate said ring with respect to said first hub when extended, whereby a new ratchet and intermediate ring tooth can be engaged.

6. A brake clearance adjuster according to claim 5, wherein the actuator is operated in parallel with a braking actuator, whereby brake clearance is adjusted each brake actuation.

7. A brake clearance adjuster according to claim 1, further comprising a spiral spring having a first and second end, said spring being coiled around the camshaft, the first end attached to the cperating lever and the second end attached to the camshaft, said spring tightening as said first hub ratchets on said intermediate ring.

* * * * *